March 1, 1927.
J. F. NELSON
FILTER
Filed March 25, 1926   2 Sheets-Sheet 1
1,619,584
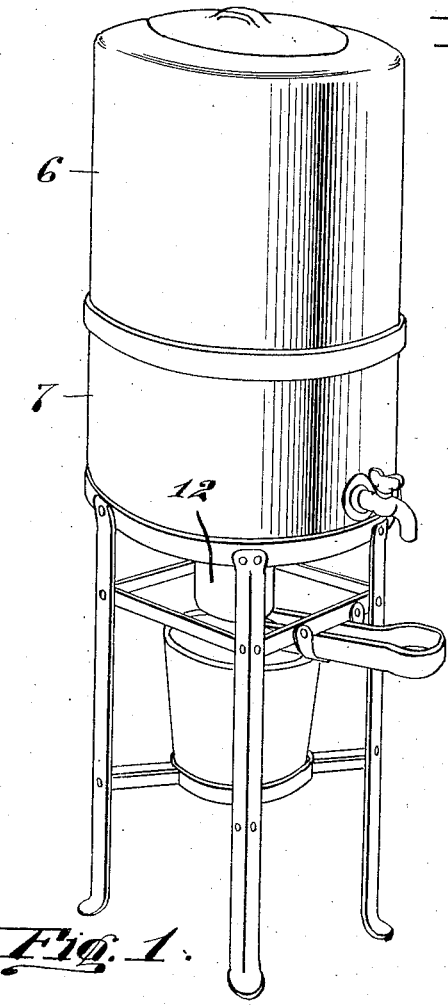
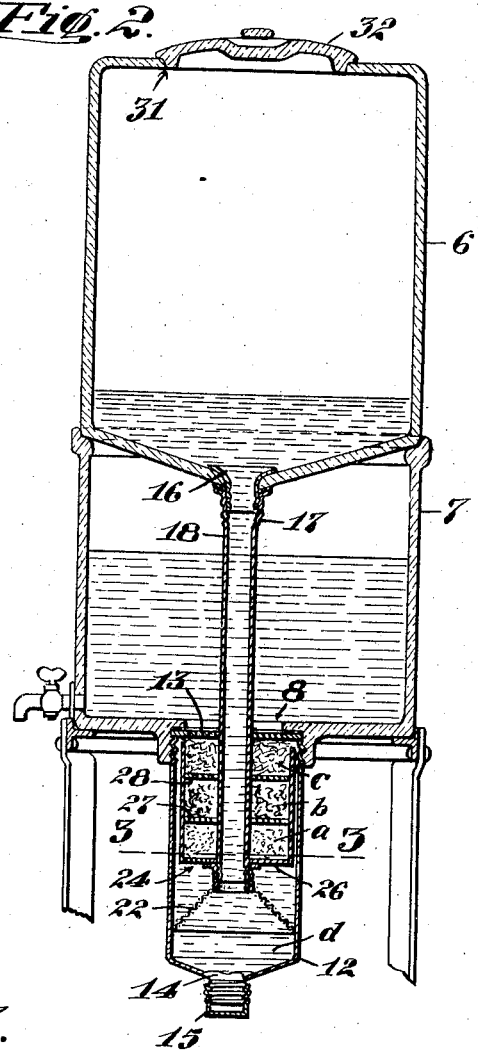
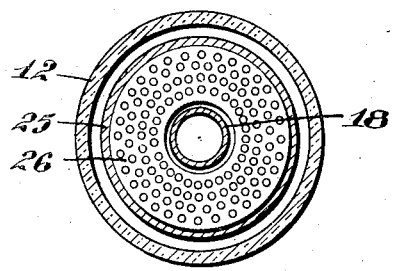
Inventor:
Joseph F. Nelson;
By R. S. Berry,
Attorney.

March 1, 1927.
J. F. NELSON
1,619,584
FILTER
Filed March 25, 1926   2 Sheets-Sheet 2
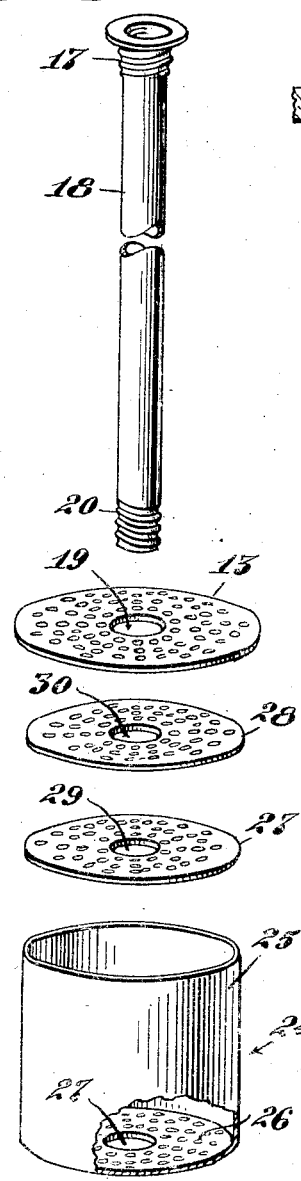
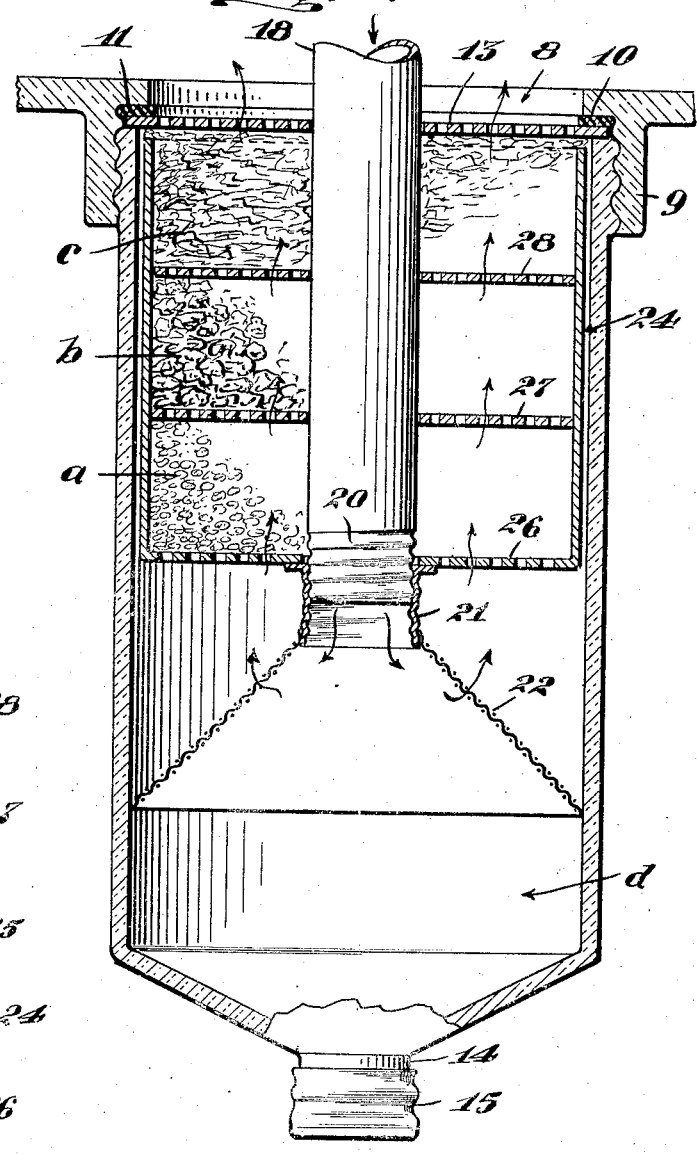
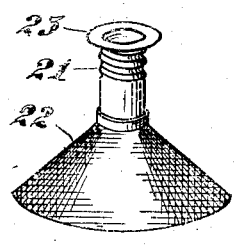
Inventor
Joseph F. Nelson:
By R. S. Berry
Attorney.

Patented Mar. 1, 1927.

1,619,584

UNITED STATES PATENT OFFICE.

JOSEPH F. NELSON, OF LOS ANGELES, CALIFORNIA.

FILTER.

Application filed March 25, 1926. Serial No. 97,414.

This invention relates to a filter and has as its primary object the provision of a filtering apparatus in which silt and other relatively coarse substances contained in the liquid to be filtered will be deposited or collected previous to the flow of the liquid through a filtering element so as to minimize clogging of the latter and thereby increase the effectiveness of the filter and prolong its period of operation without the necessity of cleaning thereof.

Another object is to provide a filter in which the silt and coarse particles in the liquid being filtered may be collected in a settling chamber and removed therefrom as occasion may require without disturbing the filtering element.

Another object is to provide a filtering element which is adapted to be readily removed and replaced and in which the filtering material may be easily removed for cleansing or renewal.

With the foregoing objects in view, together with such other objects and advantages as may subsequently appear, the invention resides generally in the provision of a settling chamber to which the liquid to be filtered is delivered by gravity, thence directed upwardly through a filtering element and more particularly resides in the construction and arrangement of the settling chamber and the filtering element and in their connections with the filtrate container.

The invention further resides in the parts and in the combination, construction and arrangement of parts hereinafter described and claimed and illustrated by way of example in the accompanying drawings, in which:—

Fig. 1 is a perspective view showing the invention as applied to a domestic water filter;

Fig. 2 is a view in vertical section of the filter apparatus shown in Fig. 1;

Fig. 3 is an enlarged section as seen on line 3—3 of Fig. 2;

Fig. 4 is a view showing the parts of the filtering element as disassembled;

Fig. 5 is an enlarged detail in section of the desilting chamber and the filtering element.

Referring to the drawings more specifically, 6 and 7 indicate superimposed liquid containers; the container being divided to receive the liquid to be filtered and the container 7 constituting a reservoir for the filtrates. The container 7 is in the form of a jar open at its top and formed with an opening 8 in its bottom wall and provided with an internally threaded annular flange 9 depending from the bottom wall around the opening 8 and having its inner periphery spaced from the margin of the opening 8 to provide a shoulder 10 against which shoulder is seated a gasket 11. A jar 12, preferably formed of glass, has screw engagement with the flange 9 and is formed with an open upper end on which is seated a perforated plate 13 which is held in place against the gasket 11 by the jar 12. The lower end of the jar 12 tapers to a drain outlet 14 normally closed by a removable cap 15.

The container 6 seats on the container 7 and has a downwardly inclined bottom wall formed with a central opening fitted with a nipple 16 to which is detachably screwed the threaded upper end 17 of a feed pipe 18, the lower end portion of which pipe extends through an opening 19 in the perforated plate 13 and terminates within the jar 12. The lower end of the pipe 18 is threaded as indicated at 20 to receive a correspondingly threaded collar 21 carrying a frustoconical screen 22 which extends across the space between the lower end of the pipe 18 and the inner periphery of the jar 12. The collar 21 is formed with an annular flange 23 on its upper end on which seats a filter container 24 comprising an imperforate cylindrical wall 25 open at its upper end and having a perforated bottom wall 26 formed with a central opening 27 through which the threaded ends 20 of the feed pipe 18 extend. This filter container is arranged within the jar 12 immediately below the perforated plate 13. The space between the perforated bottom wall 26 of the filter container and the perforated plate 13 is filled with any suitable filtering material.

In the present instance I have shown the filter as composed of superimposed layers of sand, charcoal and asbestos indicated at $a$, $b$ and $c$ respectively; the immediate layer of charcoal being separated from the layer of sand and from the layer of asbestos by perforated plates 27 and 28, which plates are arranged within the container 24 and are formed with central openings 29 and 30 respectively, through which the pipe 18 extends.

In assembling the device, the plates 13, 28 and 27 are strung in the order named on the pipe 18, whereupon the lower end of the latter is passed through the bottom wall 26 of the container 24 and screwed into engagement with the collar 21. The layer of sand $a$ is then put in place and the plate 27 seats thereon. The layer of charcoal $b$, plate 28 and layer of asbestos $c$ are then placed in the container 24 with the asbestos layer projecting slightly above the upper margin of the latter, whereupon the plate 13 is seated on the asbestos layer and the pipe 18 is passed upwardly through the opening 8 in the bottom of the container 7 and screwed into engagement with the nipple 16. By tightening the collar 21 on the thread 20 the plate 13 may be crowded against the gasket 11 and by allowing a slight clearance between the upper end of the container 24 and the underside of the plate 13 the filtering materials may be compressed between the bottom wall 26 of the container 24 and the plate 13. The jar 12 is then screwed into engagement with the flange 9.

The liquid to be filtered is then placed in the container 6 which is provided with a filler opening 31 in the upper end thereof fitted with a cover 32. The liquid flows downwardly to the pipe 18 into the space within the jar 12 below the screen 22, thence passes upwardly through the screen and through the layers of filtering material into the filtrate container 7. Silt and heavy particles contained in the unfiltered liquid will collect in the chamber $d$ formed in the lower end of the jar 12 beneath the screen 22 from whence such substances may be removed, as occasion may require by detaching the cap 15, whereby liquid in the container 7 may be discharged back through the filter and through the screen 22 and thereby effect a flushing action thereon, thus facilitating cleaning of the filter. When it is desired to renew the filtering material or to remove it for cleaning purposes the jar 12 and the feed pipe 18 are detached, thus giving access to the filter.

While I have shown and described a specific embodiment of my invention, I do not limit myself to the exact details of construction or arrangement shown, but may employ such changes and modifications as come within the spirit and scope of the appended claims and it will be understood that while I have shown the invention as applied to a domestic water filter, it is equally applicable for use for other filtering purposes.

1 claim:—

1. In a filtering apparatus, a filtrate container having an opening in its bottom wall, a depending jar extending over said opening fitted with a drain outlet, a closure for said outlet, a filter in said jar extending over the opening in the container and spaced from the lower end of the jar, and a feed pipe having its discharge end opening within the jar beneath said filter.

2. In a filtering apparatus, a pair of superimposed containers, a feed pipe leading downwardly from the upper container and extending through an opening in the bottom of the lower container, a filter carried by said pipe extending over and seating on the lower margin of the opening, and a jar demountably attached to the lower container and encompassing said filter; said jar projecting below the lower end of said pipe and forming a settling chamber.

3. In a filtering apparatus, a filtrate container having an opening in its bottom wall, a perforated plate spanning said opening, a feed pipe extending through said plate, a container having a perforated bottom wall carried by said pipe and arranged beneath said perforated plate, layers of filtering material in said last named container, perforated plates interposed between said layers, a threaded sleeve on said pipe operable to adjust the filter vertically on the pipe, and a jar carried by said filtrate container encompassing the filter and constituting a settling chamber.

4. In a filtering apparatus, a filtrate container having an opening in its bottom wall, a perforated plate spanning said opening, a feed pipe extending through said plate, a container having a perforated bottom wall carried by said pipe and arranged beneath said perforated plate, layers of filtering material in said last named container, perforated plates interposed between said layers, a threaded sleeve on said pipe operable to adjust the filter vertically on the pipe, a jar carried by said filtrate container encompassing the filter and constituting a settling chamber, and a frusto-conical screen carried by said sleeve and extending between the lower end of said pipe and the side walls of said jar.

In testimony whereof, I have affixed my signature.

JOSEPH F. NELSON.